United States Patent
Haidous et al.

(10) Patent No.: US 12,250,328 B2
(45) Date of Patent: *Mar. 11, 2025

(54) MOBILE MACHINE WITH IMPROVED MACHINE DATA AUTHENTICATION

(71) Applicant: Deere & Company, Moline, IL (US)

(72) Inventors: Ali Haidous, Fargo, ND (US); Noel Anderson, Fargo, ND (US); Gurmukh Advani, West Fargo, ND (US)

(73) Assignee: Deere & Company, Moline, IL (US)

( * ) Notice: Subject to any disclaimer, the term of this patent is extended or adjusted under 35 U.S.C. 154(b) by 130 days.

This patent is subject to a terminal disclaimer.

(21) Appl. No.: 18/451,381

(22) Filed: Aug. 17, 2023

(65) Prior Publication Data
US 2023/0403168 A1 Dec. 14, 2023

Related U.S. Application Data

(63) Continuation of application No. 16/862,857, filed on Apr. 30, 2020, now Pat. No. 11,770,265.

(51) Int. Cl.
*H04L 29/06* (2006.01)
*G06F 16/23* (2019.01)
(Continued)

(52) U.S. Cl.
CPC ........ *H04L 9/3278* (2013.01); *G06F 16/2365* (2019.01); *H04W 12/033* (2021.01)

(58) Field of Classification Search
CPC . H04L 9/3278; H04L 2209/38; H04L 9/3239; H04L 9/3271; H04L 63/0428;
(Continued)

(56) References Cited

U.S. PATENT DOCUMENTS 5,044,756 A 9/1991 Gaultney et al.
5,415,494 A 5/1995 Steffen
(Continued)

FOREIGN PATENT DOCUMENTS

CN 108564515 A 9/2018
CN 109358177 A 2/2019

OTHER PUBLICATIONS

"Estimation of Surface Soil Organic Matter Using a Ground-Based Active Sensor and Aerial Imagery" retrieved from https://pubag.nal.usda.gov/pubag/downloadPDF.xhtml?id=50136&content=PDF. D F Roberts et al, 2010, 21 pages.

(Continued)

*Primary Examiner* — Mahfuzur Rahman
(74) *Attorney, Agent, or Firm* — Christopher R. Christenson; Kelly, Holt & Christenson PLLC (57) ABSTRACT

A method of authenticating a robustly-identifiable system is provided. The method includes causing a processor of a mobile work machine to issue a challenge to a robustly-identifiable sensor module mounted relative to the mobile work machine. The method also includes receiving, by the processor of the mobile work machine, a response from the robustly-identifiable sensor module. The method also includes comparing, with the processor of the mobile work machine, the received response to an expected response to generate a match result. The method also includes selectively initiating trusted operation of the mobile work machine based on the match result.

20 Claims, 9 Drawing Sheets

(51) Int. Cl.
*H04L 9/32* (2006.01)
*H04W 12/033* (2021.01)

(58) Field of Classification Search
CPC ..... H04L 63/12; G06F 16/2365; G06F 21/36; G06F 2221/2103; G06F 21/64; G06F 21/44; H04W 12/033
See application file for complete search history.

(56) References Cited

U.S. PATENT DOCUMENTS

| | | | | |
|---|---|---|---|---|
| 8,051,489 | B1* | 11/2011 | Montenegro | H04L 63/065 726/29 |
| 8,069,470 | B1* | 11/2011 | Montenegro | H04L 9/3226 726/6 |
| 10,171,251 | B2* | 1/2019 | Kreft | G06F 21/87 |
| 10,621,164 | B1* | 4/2020 | Kain | G16H 40/20 |
| 2016/0034054 | A1* | 2/2016 | Utykanski | H02J 7/0044 235/462.13 |
| 2016/0034055 | A1* | 2/2016 | Utykanski | G06F 3/03543 235/462.13 |
| 2016/0036257 | A1* | 2/2016 | Utykanski | G06F 1/1632 320/103 |
| 2018/0054490 | A1* | 2/2018 | Wadhwa | G08G 1/0129 |
| 2018/0287806 | A1* | 10/2018 | Carboni | H04W 12/06 |
| 2018/0359259 | A1* | 12/2018 | Leon | G06F 9/445 |
| 2019/0017982 | A1 | 1/2019 | Lamberti et al. | |
| 2019/0122017 | A1* | 4/2019 | Atkinson | G06F 3/03545 |
| 2020/0103894 | A1* | 4/2020 | Cella | H04L 1/0002 |
| 2020/0245115 | A1* | 7/2020 | Dorrance | G01C 21/3896 |
| 2021/0083862 | A1* | 3/2021 | Pointcheval | H04L 9/0844 |
| 2021/0344516 | A1* | 11/2021 | Haidous | H04L 9/3271 |

OTHER PUBLICATIONS

"Remote Sensing Techniques for Soil Organic Carbon Estimation: A Review" retrieved from https://www.mdpi.com>pdf-vor, Angelopoulou et al. 2019, 18 pages.

U.S. Appl. No. 62/838,630, filed Apr. 25, 2019, Application and Drawings, 60 pages.

U.S. Appl. No. 16/445,704, filed Jun. 19, 2019, Application and Drawings, 53 pages.

"Learn how to enrich your soil & your bottom line", Retrieved at: <https://www.indigoag.com/for-growers/indigo-carbon>, Retrieved on May 21, 2020, 7 pages.

German Search Report issued in application No. DE102021202866.7 dated Sep. 1, 2021 (10 pages).

U.S. Appl. No. 16/862,857 Non Final Office Action dated Dec. 19, 2022, 17 pages.

U.S. Appl. No. 16/862,857 Notice of Allowance dated Jun. 16, 2023, 9 pages.

* cited by examiner

MOBILE MACHINE WITH IMPROVED MACHINE DATA AUTHENTICATION

CROSS-REFERENCE TO RELATED APPLICATION

The present application is a continuation of and claims priority of U.S. patent application Ser. No. 16/862,857, filed Apr. 30, 2020, the content of which is hereby incorporated by reference in its entirety.

FIELD OF THE DESCRIPTION

The present description generally relates to data acquisition in off-road machinery. More specifically, but not by limitation, the present description relates to authentication of off-road machinery data.

BACKGROUND

Off-road machinery data acquisition is used in a variety of applications to provide data about a process or operation. Such processes or operations include, without limitation, off-road machinery data acquisition is in the field of agriculture where data is vitally useful for crops, data acquisition is in the field of forestry, construction equipment, mining equipment, et cetera.

One limitation of current off-road data acquisition is that, in some instances, the data itself may be spoofed or otherwise acquired or transmitted in an untrustworthy manner. Spoofed data can lead to erroneous results in a process that relies on such data. One example of a process that relies on such data is the administration of carbon credits and payments or other activities in furtherance of such administration. As can be appreciated, spoofed data indicative of carbon capture could lead to improper payments, regulatory compliance, or carbon credits based on an erroneous value indicative of carbon sequestration.

Thus, it is becoming more important to provide a system and method to acquire and provide data for off-road machinery such that the data may be trusted and relied upon.

The discussion above is merely provided for general background information and is not intended to be used as an aid in determining the scope of the claimed subject matter.

SUMMARY

A method of authenticating a robustly-identifiable system is provided. The method includes causing a processor of a mobile work machine to issue a challenge to a robustly-identifiable sensor module mounted relative to the mobile work machine. The method also includes receiving, by the processor of the mobile work machine, a response from the robustly-identifiable sensor module. The method also includes comparing, with the processor of the mobile work machine, the received response to an expected response to generate a match result. The method also includes selectively initiating trusted operation of the mobile work machine based on the match result.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Embodiments described herein generally provide an off-road mobile work machine with improved data authentication such that data from the mobile work machine may be relied upon for, without limitation, such things as payments, regulation compliance verification, warranty claims, equipment depreciation, et cetera.

Figure 1:
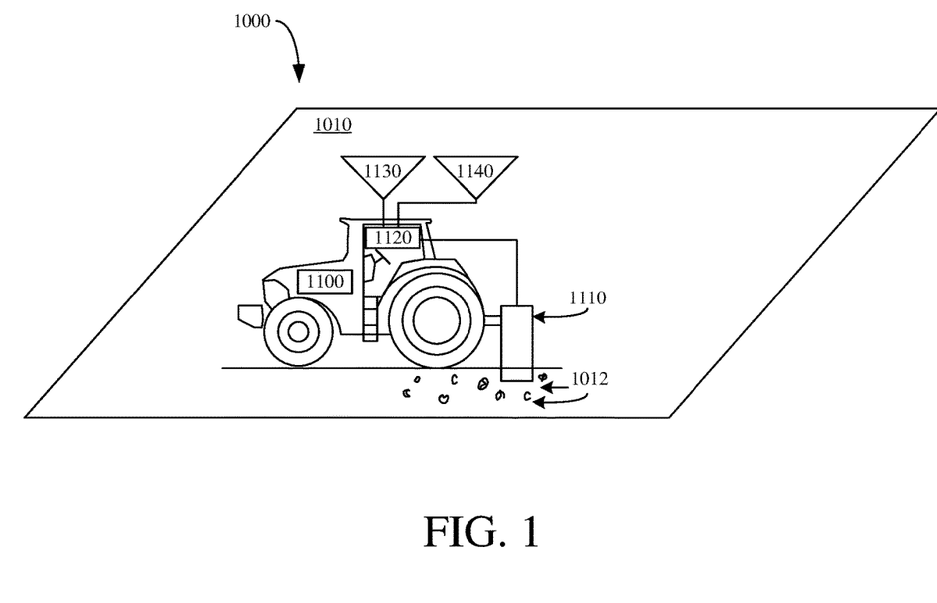
FIG. 1 is a diagrammatic view of a mobile machine data capture system operating in a field in accordance with one embodiment.

FIG. 1 is a diagrammatic view of a mobile machine data capture system operating in a field in accordance with one embodiment. In the example illustrated in FIG. 1, mobile machine 1100 is a tractor pulling a task sensor 1110 through field 1010. In one example, task sensor 1110 is configured to include a soil organic matter (SOM) sensor 1012 which is able to provide an indication of soil organic matter as sensor 1012 contacts soil in field 1010. In this example, a single element of each type is shown for simplicity. In other embodiments, there may be one or more of such elements. Further, a plurality of such elements may be used to detect element faults or to implement fault tolerance. In another example, preliminary validation of data could be accomplished by voting through mutual interlocking of primary sensors/data collectors. In other examples, the plurality of elements may enhance system capabilities such as task sensors deployed on equipment for per-row data collection. Mobile machine 1100 includes a robustly identifiable processor 1120 coupled to a robustly identifiable location/motion module 1130. Location/motion module 1130 is configured to interact with environmental navigation signals (such as GPS, global navigation satellite signals, LORAN, or other suitable signals) to provide processor 1120 with an indication of the geographic position of mobile machine 1100. Additionally, mobile machine 1100 includes a wireless transceiver 1140 configured to communicate wirelessly with one or more remote devices. Examples of such wireless communication include, without limitation, Bluetooth (such as Bluetooth Specification 2.1 rated at Power Class 2); a Wi-Fi specification (such as IEEE 802.11.a/b/g/n); a known RFID specification; cellular communication techniques (such as GSM/CDMA); WiMAX (IEEE 802.16), and/or satellite communication.

Each element of the mobile machine 1100 is termed "robustly identifiable" in order to indicate that it may not be copied or cloned from the device. In one example, robustly identifiable elements include, for example, a physically unclonable function "PUF." Thus, the element cannot be replaced with a substitute or cloned physical replacement or a computer simulation with the same identifier. In some examples, the replacement could be used to falsify sensor data values, data location, data timestamp, et cetera prior to being added to a data ledger or store such as a block chain record. Further, a robustly identifiable element is, in one embodiment, packaged in a tamper-evident or tamper-proof way so that if replacement is attempted, it will not succeed without at least detection. Finally, a robustly identifiable element is connected with other elements in a way which protects the information being communicated. This may include encryption of messages but may also further include how encryption keys are assigned, stored, and managed, to ensure secure data exchange between the elements. By providing a number of robustly identifiable elements on the mobile machine 1100, the elements above cannot be replaced to spoof georeferenced data collection. If such an element is replaced, it is done with external verification, such that the replacement is noted in a trusted way, such as in an immutable ledger (e.g., block chain record).

Figure 2:
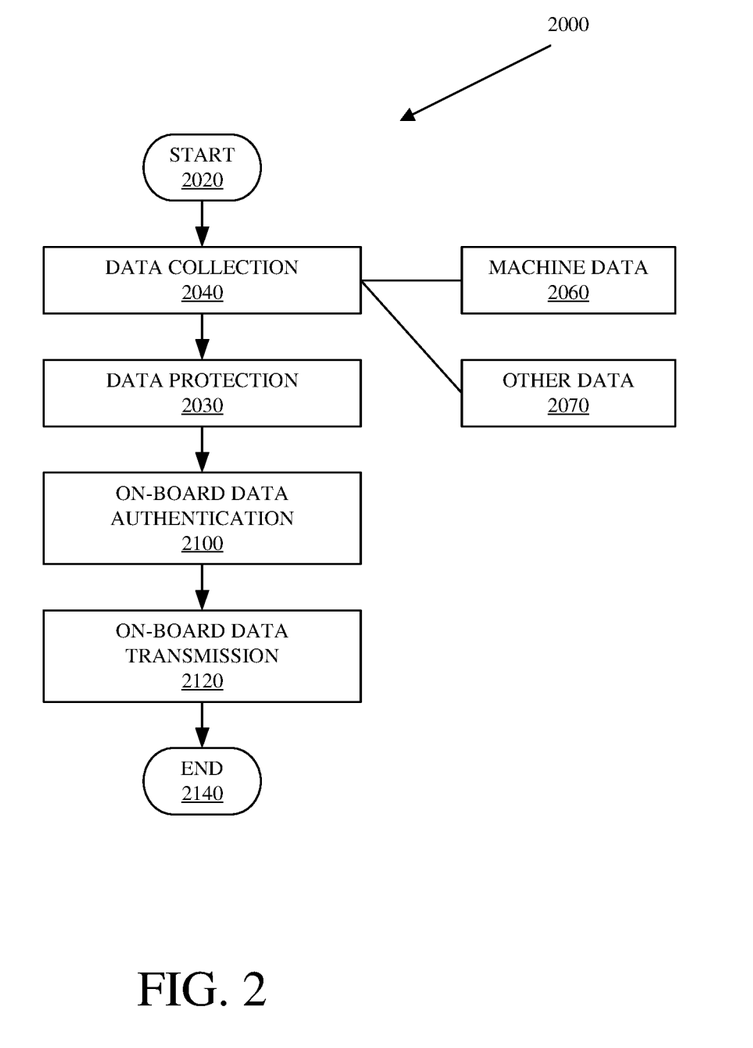
FIG. 2 is a flow diagram of a method of acquiring and authenticating mobile machine data in accordance with one embodiment.

FIG. 2 is a flow diagram of a method of acquiring and authenticating mobile machine data in accordance with one embodiment. Method 2000 begins at block 2020 and proceeds to block 2040 for data collection. The collected data can include mobile machine data 2060 as well as other suitable data 2070. An example of machine data 2060 can include the tractor going through the field and collecting data using one or more robustly identifiable sensors which will be described in greater detail below. Next, at block 2030, data protection is performed. In one embodiment, data protection 2030 is performed using steganography. Steganography is a technique of hiding secret data within an ordinary, non-secret file or message in order to avoid detection. The secret data is then extracted at its destination. The secret data can include the authentication data. In another example, data protection 2030 is done using watermarking. Watermarking is the process of hiding digital information in a carrier signal; the hidden information should, but does not need to, contain a relation to the carrier signal. Digital watermarks may be used to verify the authenticity or integrity of the carrier signal or to show the identity of its owners. In some examples, data protection 2030 is done by a secret transformation of value representations such as encryption/decryption. In some other examples, data values are protected by a secret mapping of value representation pieces to storage locations, such as steganography. These various examples of data protection may be used alone or in combination.

Next, at block 2100, the mobile machine performs on-board data authentication, which will be described in greater detail below. If the on-board data authentication fails, the mobile machine provides an identification of such failure and a non-trusted mode is entered. In such non-trusted mode, a third party could authenticate data and/or corroborate and transmit data, as required. However, if on-board data authentication is successful, method 2000 moves to on-board data transmission block 2120. At on-board data transmission block 2120, the mobile machine transmits the authenticated data using suitable wireless communication. Such wireless communication is performed using secure communication techniques, such as cryptography. Finally, at block 2140, method 2000 ends.

Figure 3:
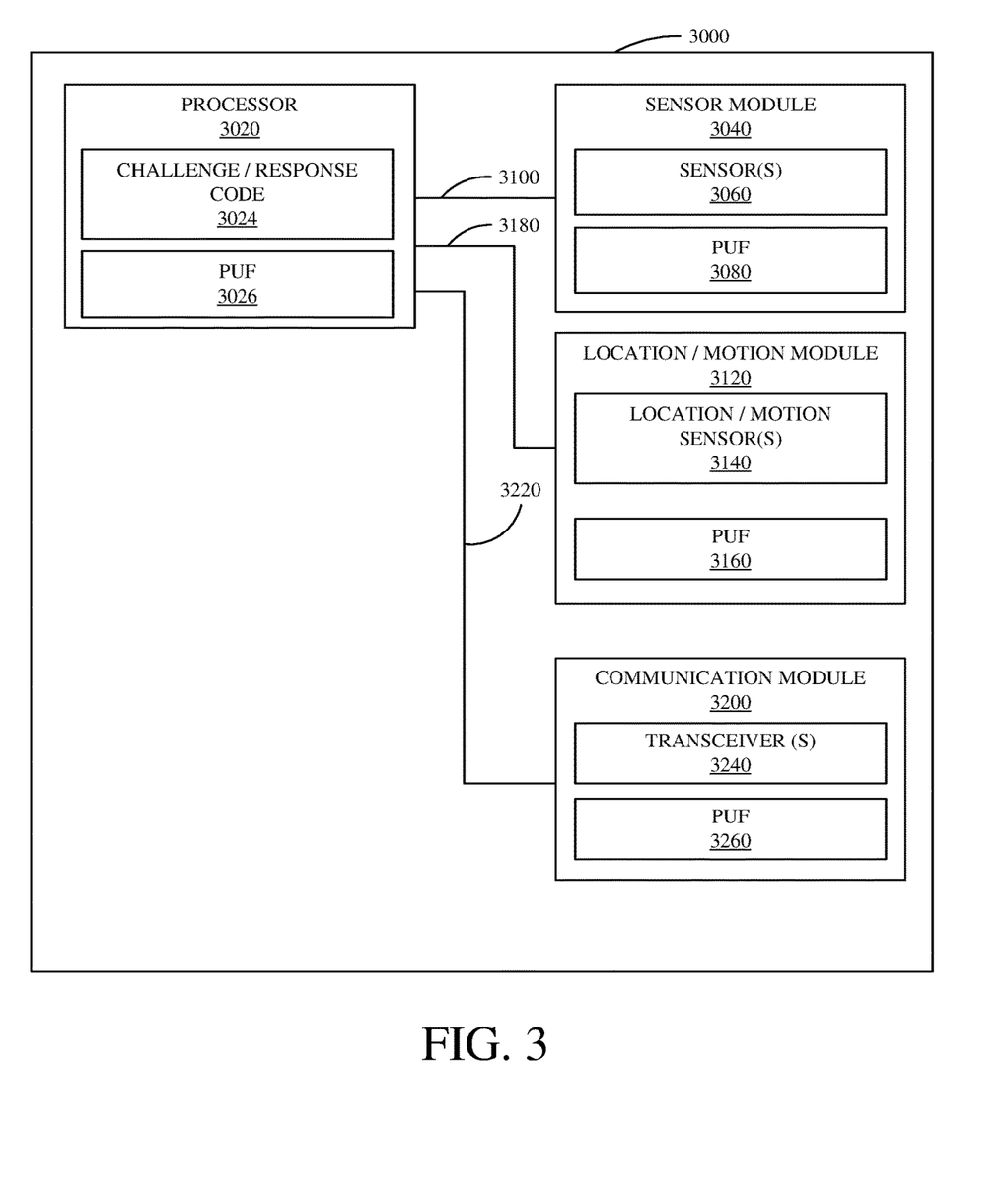
FIG. 3 is a block diagram of a mobile machine data capture system in accordance with one embodiment.

FIG. 3 is a block diagram of a mobile machine data capture system in accordance with one embodiment. System 3000 includes robustly identifiable processor 3020. Processor 3020 can include a microprocessor or any other suitable integrated circuitry that is capable of performing instructions to provide authentication. In one example, processor 3020 includes or is coupled to a source 3024 of challenge/response code. Challenge/response code 3024 can include instructions that cause processor 3020 cause or command processor 3020 to issue a challenge to a robustly-identifiable system as well as instructions to compare the robustly identifiable system's response to the challenge with an expected response. Further, challenge/response code 3024 may also include code to allow processor 3020 to access its own physically unclonable function module 3026 and compare a response with an expected response. In this way, processor 3020 can determine whether it, itself, is an authentic processor, or one that has been replaced.

As processor 3020 issues challenges to each robustly-identifiable system, and receives responses, processor 3020 determines whether each robustly identifiable system is authenticated. As shown in FIG. 3, a first robustly-identifiable system is indicated at sensor module 3040 which includes, or is coupled to, one or more task sensors 3060, such as a soil organic matter sensor, or other suitable sensor as well as a physically unclonable function (PUF) module 3080. When sensor module 3040 receives a challenge from processor 3020 via communication line 3100, sensor module 3040 employs physically unclonable function module 3080 to provide its response. In some examples, the response may be dedicated strictly to responding to the challenge. In other examples, the response may be part of a message which incorporates other data from a module.

A physically unclonable function is generally a physical object that, for a given input and conditions (i.e., challenge), provides a physically-defined "digital fingerprint" output (response) that serves as a unique identifier. Physically unclonable functions are sometimes based on unique physical variations that occur naturally during semiconductor manufacturing. A physical unclonable function is a physical entity embodied in a physical structure. Physical unclonable functions are available in integrated circuits, and are sometimes used in applications with high security requirements, such as cryptography.

System 3000 also includes a robustly-identifiable location/motion module 3120. Location/motion module 3120 includes one or more location/motion sensors 3140 as well as location/motion physically unclonable function module 3160. Location/motion sensors 3140 can include geographic location sensors, such as GPS, GLONASS (Russia), Galileo (EU), BeiDou, and/or fixed LORAN. Further, motion sensors can include suitable inertial measurement units, accelerometers, gyroscopes, or any suitable sensor that provides an indication relative to motion of the mobile machine. Location/motion module 3120 is coupled to a digital communication line 3180 in order to receive a challenge from processor 3020. When such challenge is received, module 3120 accesses location/motion physically unclonable function module 3160 to provide a response.

Robustly identifiable communication module 3200 is coupled to processor 3020 and includes one or more wireless transceivers 3240. Additionally, robustly identifiable communication module 3200 includes communication module physical unclonable function 3260. Communication module 3200 is configured to receive a challenge from robustly identifiable processor 3020 via communication line 3220 and provide a response based on communication module physical unclonable function 3260.

While each of robustly identifiable modules 3040, 3120, and 3200, are illustrated as being coupled to robustly identifiable processor 3020 via respective communication lines 3100, 3180, and 3220, it is expressly contemplated that all such robustly identifiable modules could be coupled to robustly identifiable processor 3020 via a single communication line or bus. Any of processor 3020 and robustly identifiable modules 3040, 3120, and 3200 may be in separate enclosures or shared enclosures. The enclosures may include physical tamper-proof features.

Figure 4:
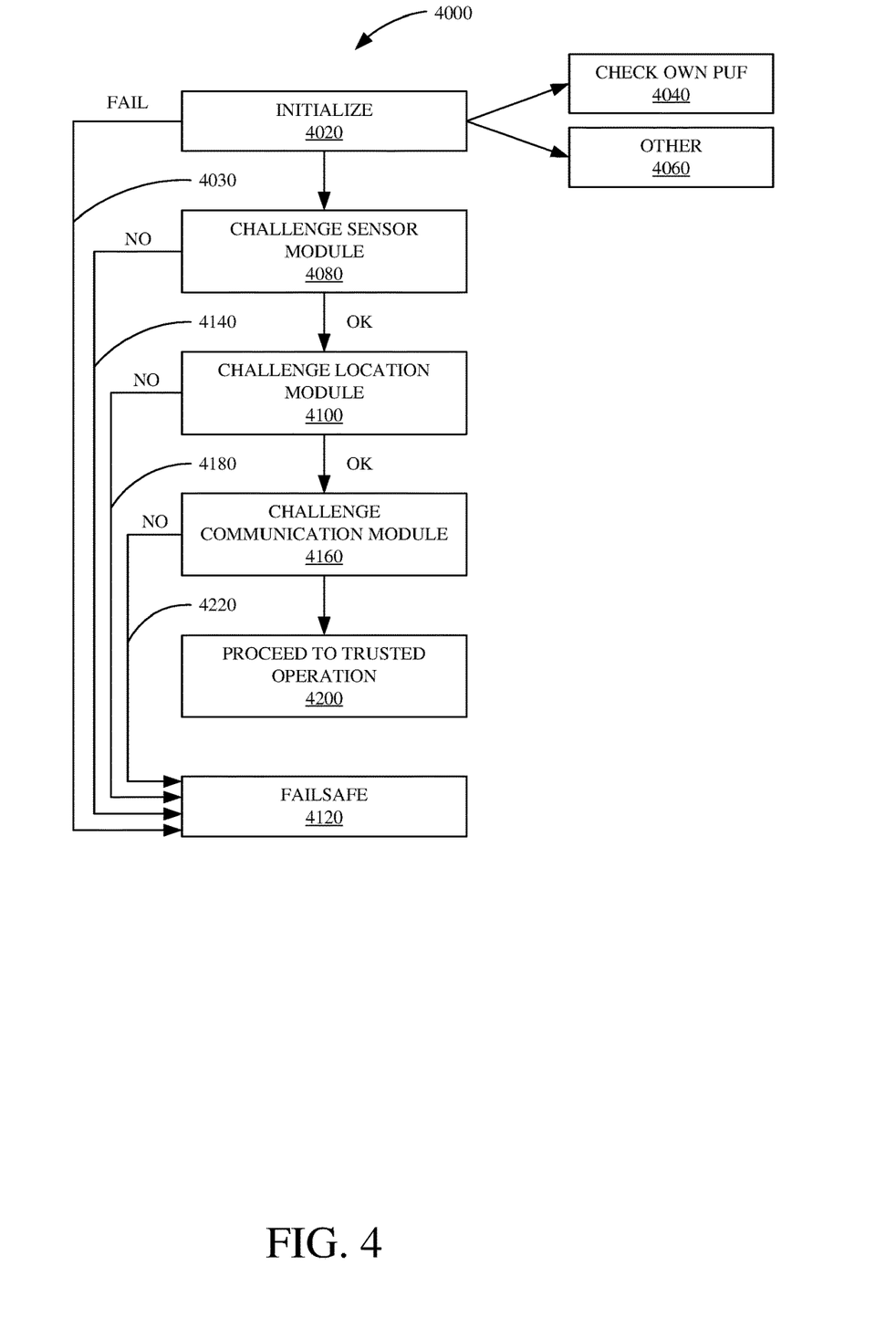
FIG. 4 is a flow diagram of a method of authenticating a robustly identifiable system in accordance with one embodiment.

FIG. 4 is a flow diagram of a method of authenticating a robustly-identifiable system in accordance with one embodiment. This example is hierarchical with processor 3020 as lead. In other examples, other components may take the lead. In still other examples, a peer, hybrid peer/hierarchical or other architectures may be used as well. Method 4000 begins at block 4020 where a processor, such as processor 3020, initializes. During such initialization, the processor may check its own robustly-identifiable function, such as challenging and comparing its own response utilizing a physically unclonable function, as described above. This is indicated generally at block 4040. Additionally, other suitable techniques that generate a uniquely identifiable response based upon a challenge can be used, as indicated at block 4060. Regardless of the technique, upon completion of initialization block 4020, the processor or other suitable control circuitry of the robustly identifiable system can determine whether it is an authenticated physical device. In the event that the processor is unable to authenticate itself, method 4000 proceeds to failsafe block 4120 as indicated at reference numeral 4030.

Next, control passes to block 4080 where the authenticated processor issues a challenge to a robustly-identifiable sensor module. For example, the authenticated processor may issue a challenge over a communication line, such as line 3100, to a sensor module having a robustly identifiable aspect, such as a physically unclonable function module 3080. The authenticated processor then receives a response from the robustly-identifiable sensor module and compares the received response with an expected response known by the authenticated processor. If the received response matches the expected response, control passes to block 4100. However, if the received response does not match the expected response, indicating failure in authentication of the sensor module, control passes to failsafe block 4120 via line 4140.

Next, at block 4100, the authenticated processor issues an authentication challenge to a robustly-identifiable location/movement module, such as module 3120. If the location/motion module issues the correct response, method 4000 proceeds to block 4160. However, if the location/movement module fails to issue the expected response to the challenge, then control passes to failsafe block 4120 via line 4180.

Next, at block 4160, the authenticated processor issues a challenge to a communication module, such as communication module 3200. In response, the communication module accesses its own robustly-identifiable indicator or physically unclonable function and provides a response to the challenge. If the response to the challenge is the expected response, method 4000 proceeds to block 4200 where trusted operation is initiated. During trusted operation, all data acquired and stored can be considered as trusted data. However, if the response of the communication module to the challenge does not match the expected response, control passes to failsafe module 4120 via line 4220.

At fail safe module 4120, data acquisition and capture can still occur. However, the processor will provide an indication that authentication failed such that an appropriate level of trust and/or external authentication/corroboration can be performed.

Figure 5:
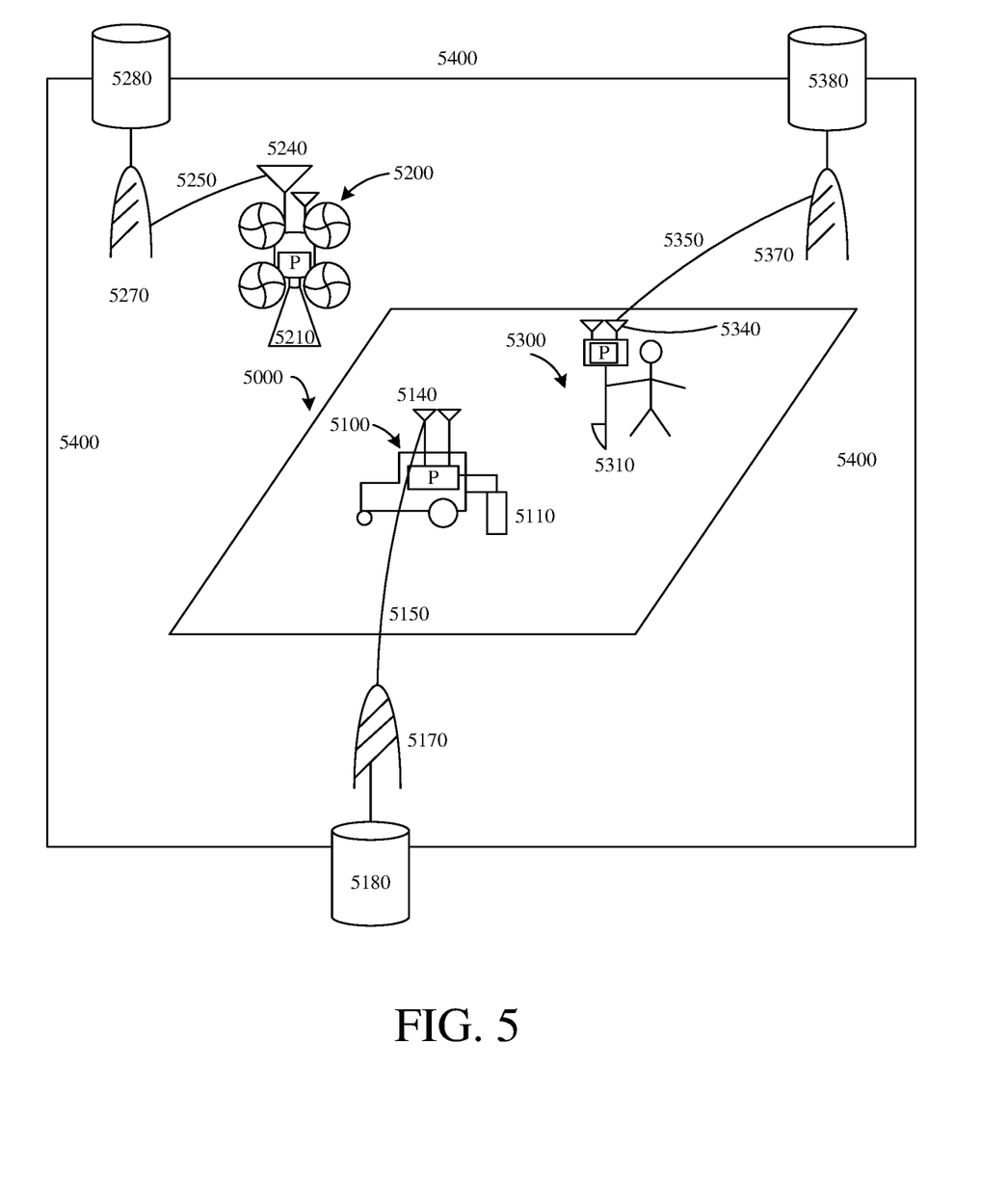
FIG. 5 is a diagrammatic view of a data capture system operating in a simultaneous mode in accordance with one embodiment.

FIG. 5 is a diagrammatic view of a data capture system operating in a simultaneous mode in accordance with one embodiment. The simultaneous mode illustrates an additional level of authenticity that may be added by independent confirmation of field activity such as the soil organic matter (SOM) data collection. This confirmation could, in some embodiments, become part of a distributed immutable ledger. The simultaneous mode illustrated with respect to FIG. 5 can be performed upon authentication failure with respect to the method described with respect to FIG. 4. However, simultaneous mode can also be performed in order to provide additional authenticity even when the authentication described with respect to FIG. 4 is completed successfully.

As shown in FIG. 5, three independent soil organic matter measure surveys are being performed. They may be occurring simultaneously or separated in time. A terrestrial sensor system 5100 (illustrated diagrammatically as a mobile machine-tractor) similar to the one described with respect to FIG. 1, collects georeferenced soil organic matter data from task sensor 5110 and sends it via transceiver 5140 over secure communications link 5150 to receiver 5170 for storage on secure server 5180.

FIG. 5 also illustrates an aerial sensor system (illustrated diagrammatically as an unmanned aerial vehicle) 5200 collecting georeferenced soil organic matter data from task sensor 5210 and sending it via transceiver 5240 over secure communications link 5250 to receiver 5270 for storage on secure server 5280. Aerial sensor system 5200 may have a pole, UAV, manned aircraft, satellite, et cetera, as a sensor platform.

Similarly, a manual sensor system 5300 collects georeferenced soil organic matter data from task sensor 5310 and sends it via transceiver 5340 over secure communications link 5350 to receiver 5370 for storage on secure server 5380.

Secure servers 5180, 5280, and 5380 are connected by a secure network 5400. The authentic georeferenced data collected by task sensors 5110, 5210, and 5310 may be combined and stored or otherwise persisted in a distributed, immutable ledger, such as a blockchain.

The distributed, immutable ledger may be used to document the amount of carbon or any other suitable chemical sequestered in the soil, for example. Surveys taken at a plurality of times may be used to document the change in sequestered carbon over time. This measured difference may be used to establish premiums, payments, and penalties. In one SOM example, mobile machine 5100 may be a farmer-owned tractor, aerial sensor system 5200 may be a USDA-owned drone, and manual sensor system 5300 may be a carbon exchange auditor point probe.

The measured values and trends may be used to guide farming practices such as tillage location, type, and depth. Further, the measured values may be used to guide planting and seeding depths, crop care chemical selection and prescription, and harvest residue management.

Figure 6:
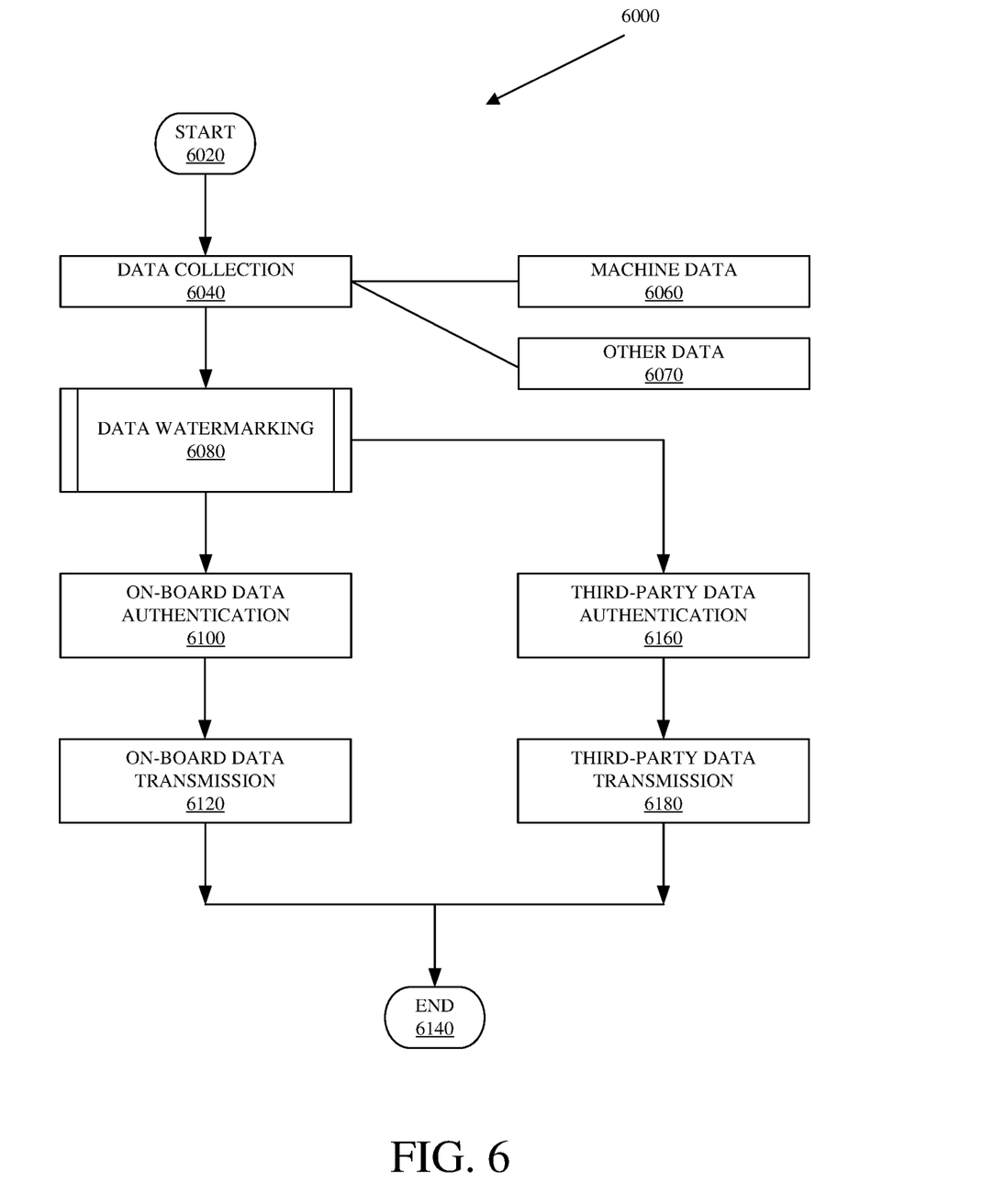
FIG. 6 is a flow diagram of a method of performing simultaneous machine data capture in accordance with one embodiment.

FIG. 6 is a flow diagram of a method of performing simultaneous machine data capture in accordance with one embodiment. Method 6000 begins at block 6020 and proceeds to block 6040 where data collection occurs. This data collection can include machine data 6060 as well as on any other suitable data, as indicated at block 6070. Next, method 6000 proceeds to block 6080 where data watermarking is performed. Once the data watermarking is performed, flow splits with processing occurring at both on-board data authentication block 6100 as well as third-party data authentication block 6160. On-board data authentication 6100 is generally performed with respect to the mobile machine, such as a tractor. Further, this block 6100 can include the steps or block described with respect to FIG. 4.

Third-party data authentication block 6160 occurs where one or more third-parties authenticate or corroborate data captured by the machine. This authentication could be performed as set forth above, with respect to robustly-identifiable systems. However, the third-party authentication could also be performed in other ways. In the most secure embodiments, all third-parties will also check to see if their own components are expected using the robustly-identifiable techniques described above.

At block 6120, the mobile machine transmits its acquired machine data regardless of whether the authentication for the on-board data was successful. However, in the event that the on-board data authentication at block 6100 was not successful, the on-board data transmission block 6120 will include an indication of failure of such authentication.

Turning to block 6180, the third-party data transmission occurs. The data from the on-board data transmission as well as the third-party data transmission is then compared to make sure there are no discrepancies or that any discrepancies are within a margin of error. The margin can be specified depending on the type of transaction or operation being performed. Further, the actual provided data relative to the operation can be interpolated based on the on-board data transmission and the third-party data transmission. The final processed or interpolated data with respect to the operation may then be stored in an immutable ledger, such as using a blockchain. Further, the communication with the immutable ledger is preferably encrypted. These ledgers are generally accessed for read publicly and for write in an authenticated manner. The ledger's data cannot be altered (i.e. immutable). The communication with the immutable ledger is signed or otherwise authenticated to uniquely identify the entity communicating with the ledger, but the communication does not necessarily need to be encrypted.

Figure 7:
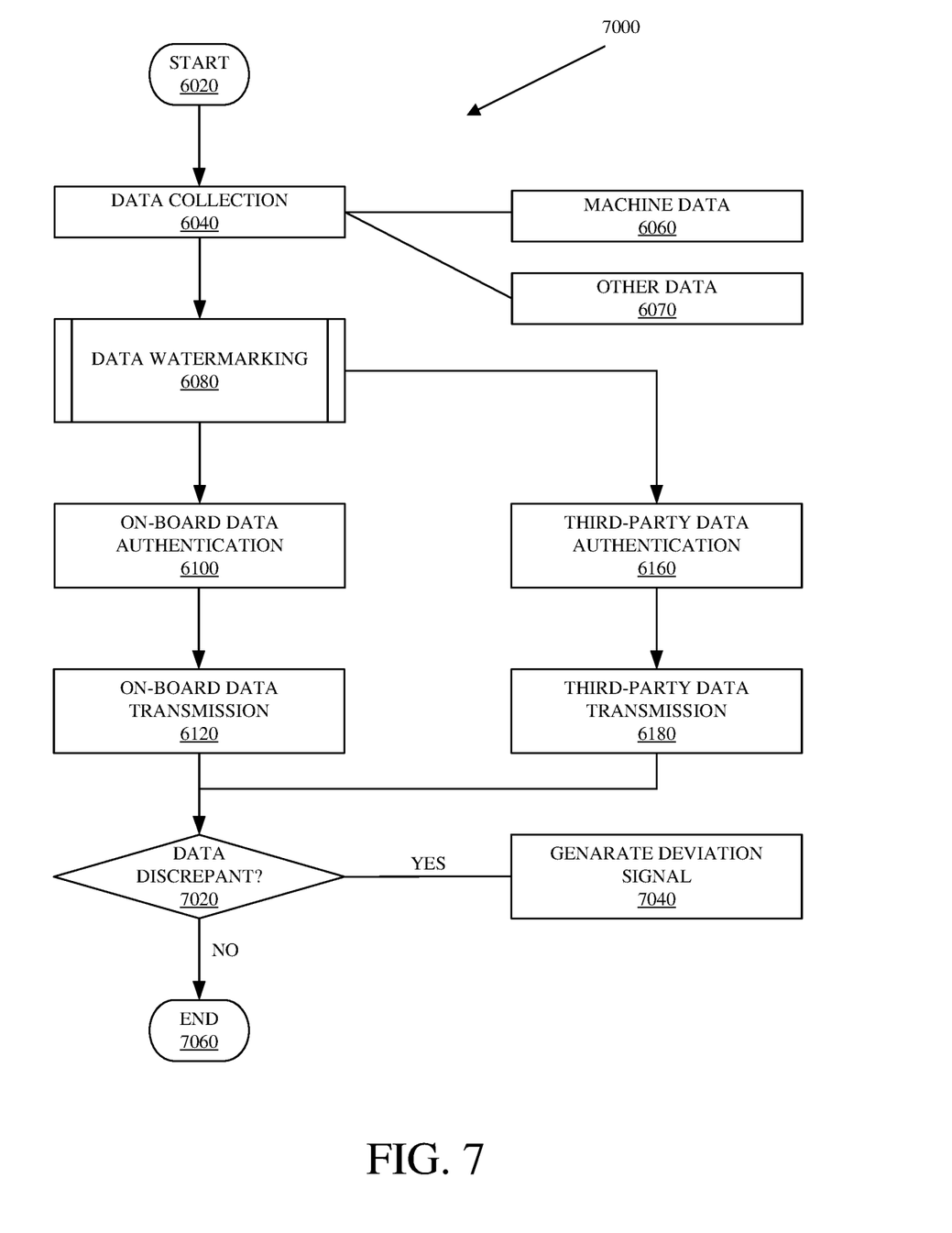
FIG. 7 is a flow diagram of a method of performing simultaneous machine data capture in accordance with one embodiment.

FIG. 7 is a flow diagram of a method of performing simultaneous machine data capture in accordance with one embodiment. Method 7000 is similar to method 6000 and like components are numbered similarly. As can be seen, method 7000 includes an explicit data comparison step at block 7020 which determines whether the data from the on-board transmission block 6120 and the third-party data transmission block 6180 are discrepant. If the data are not discrepant, control passes to block 7060 where method 7000 ends by using the non-discrepant data. However, if block 7020 determines that the data is discrepant, or discrepant beyond a selected threshold (such as 5% or 10%) method 7000 generates a deviation signal at block 7040 indicating that the data discrepancy, which can allow those who reply upon the mobile machine's data to ascribe less trust or confidence in the data for critical decisions.

While embodiments described thus far have generally described a soil organic matter sensor, this is for illustration purposes only. It is expressly contemplated that embodiments described herein are applicable to any type of data acquisition with respect to any mobile machine where data authentication is important. Examples of other operations or industries where such data authentication is important include, without limitation, forestry, soil compaction, chemical application, tillage, planting/seeding, organic practices, and carbon sequestration. For example, cut-to-length timber harvesters have sensors for measuring tree length and diameter. The sensors have been proposed for measuring wood density. Such sensors could replace the soil organic matter sensor described above and provide an authenticated manner for capturing data with respect to wood volume being removed from a forest. Such data could be used to estimate the amount of carbon being removed from the forest in the form of wood.

In another example, referring to FIG. 1, the mobile machine could instead be a construction soil compactor which comprises a compaction drum with a compaction sensor in addition to a task processor, location/motion sensor, transceiver, and network. Rather than measuring soil organic matter, the construction soil compactor compacts soil for a road bed. The compaction level must meet a contractual or project specification prior to, for example, putting a layer of concrete over the bed as a road. In FIG. 5, modifications to machine 5100 could carry over from the above description of FIG. 1. Soil compaction data would be collected by a sub-contractor machine. Human 5340, a Department of Transportation employee, may use a cone penetrometer to obtain soil compaction data. Drone 5200 may be owned and operator by the contractor who is monitoring work of the sub-contractor machine. Authenticated data from the three sources may be combined into a distributed immutable ledger, such as a blockchain-like distributed, immutable ledger to provide a record of operations occurring on the worksite.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems. Example implementations of the invention may use one or more processors. In multi-processor implementations, the processors may be local, remote, or a mixture. The processors may share information via wired, wireless, or a mixture of such communications techniques. Further, in multi-processor embodiments, portions of computations may be fixedly or dynamically assigned to different processors.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 8:
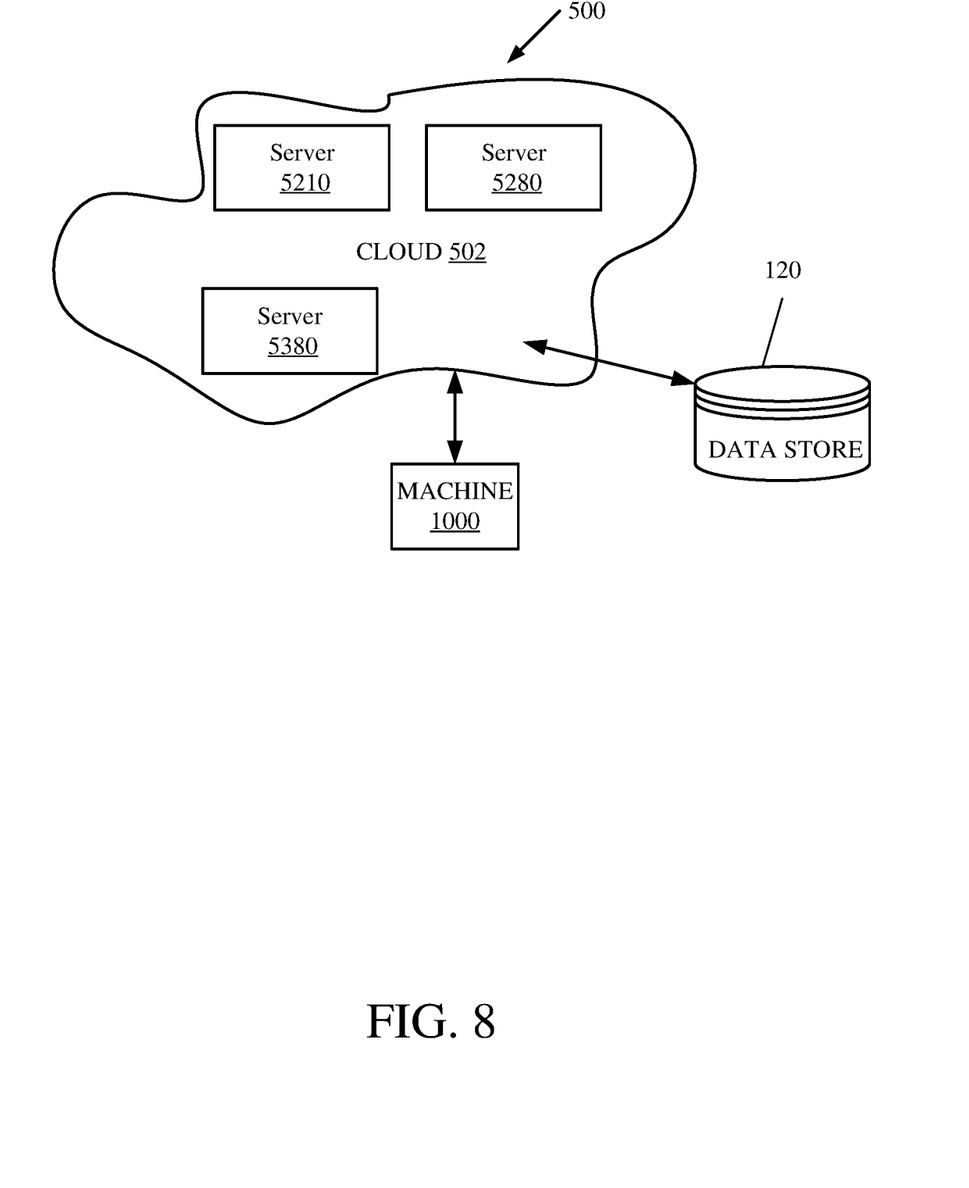
FIG. 8 also depicts another embodiment of a remote server architecture.

FIG. 8 a block diagram of mobile machine 1000, shown in FIG. 1, except that it communicates with elements in a remote server architecture 500. In an example embodiment, remote server architecture 500 can provide computation, software, data access, and storage services that do not require end-user knowledge of the physical location or configuration of the system that delivers the services. In various embodiments, remote servers can deliver the services over a wide area network, such as the internet, using appropriate protocols. For instance, remote servers can deliver applications over a wide area network and they can be accessed through a web browser or any other computing component. Software or components shown in FIG. 1 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the embodiment shown in FIG. 8, some items are similar to those shown in FIG. 5 and they are similarly numbered. FIG. 8 specifically shows servers 5180, 5280, and 5380 can be located at a remote server location 502. Therefore, mobile machine 1000 accesses those systems through remote server location 502.

FIG. 8 also depicts another embodiment of a remote server architecture. FIG. 8 shows that it is also contemplated that some elements are disposed at remote server location 502 while others are not. By way of example, remote storage 120 can be disposed at a location separate from location 502 and accessed through the remote server at location 502. Regardless of where they are located, they can be accessed directly by mobile machine 1000, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties.

Figure 9:
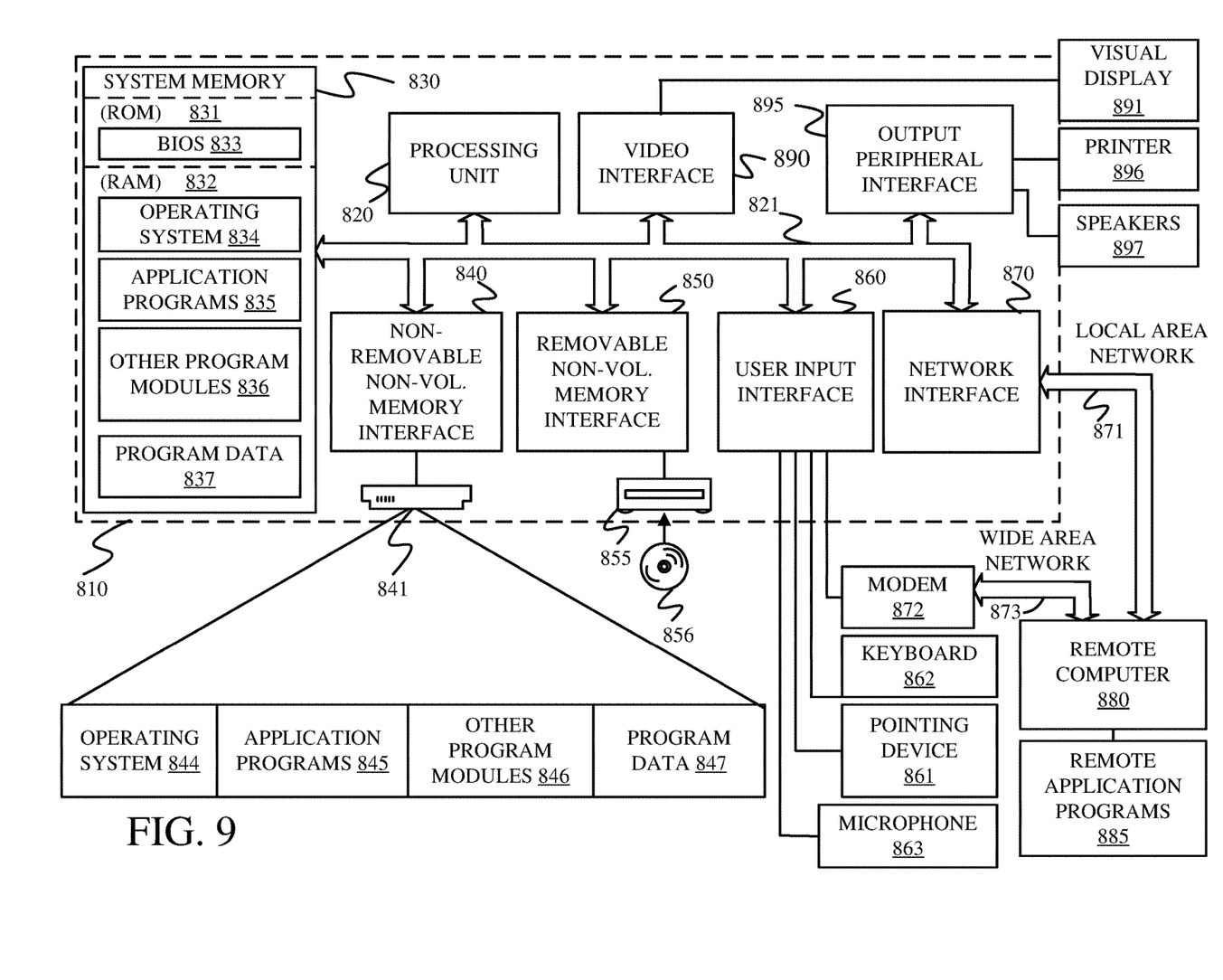
FIG. 9 illustrates one example of a computing environment in which elements of FIGS. 1 and/or 5, or parts thereof, (for example) can be deployed.

FIG. 9 illustrates one example of a computing environment in which elements of FIGS. 1 and/or 5, or parts thereof, (for example) can be deployed. With reference to FIG. 9, an exemplary system for implementing some embodiments includes a general-purpose computing device in the form of a computer 810. Components of computer 810 may include, but are not limited to, a processing unit 820 (which can comprise processor 108), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory, programs and/or code described with respect to FIGS. 1, 3 and/or 5 can be deployed in corresponding portions of FIG. 9.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 9 illustrates operating system 834, application programs 835, other program modules 836, and program data 837.

The computer 810 may also include other removable/non-removable volatile/nonvolatile computer storage media. By way of example only, FIG. 9 illustrates a hard disk drive 841 that reads from or writes to non-removable, nonvolatile magnetic media, a magnetic disk drive 851, nonvolatile magnetic disk 852, an optical disk drive 855, and nonvolatile optical disk 856. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (e.g., ASICs), Program-specific Standard Products (e.g., ASSPs), System-on-a-chip systems (SOCs), Complex Programmable Logic Devices (CPLDs), etc.

The drives and their associated computer storage media discussed above and illustrated in FIG. 9, provide storage of computer readable instructions, data structures, program modules and other data for the computer 810. In FIG. 9, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 9 illustrates, for example, that remote application programs 885 can reside on remote computer 880.

It should also be noted that the different embodiments described herein can be combined in different ways. That is, parts of one or more embodiments can be combined with parts of one or more other embodiments. All of this is contemplated herein.

Example 1 is a mobile work machine data capture system comprising: a robustly-identifiable sensor module having a task sensor that provides a task sensor signal indicative of a task; and a processor coupled to the robustly-identifiable sensor module, the processor being configured to issue a challenge to the robustly-identifiable sensor module and compare a response from the robustly-identifiable sensor module to an expected response to authenticate the robustly-identifiable sensor module, the processor being further configured to generate an indication of authentication failure if the response from the robustly-identifiable sensor module does not match the expected response.

Example 2 is the mobile work machine data capture system of any or all previous examples, wherein the robustly-identifiable sensor module includes a physically unclonable function module and wherein the response from the robustly-identifiable sensor module is based on a characteristic of the physically unclonable function module.

Example 3 is the mobile work machine data capture system of any or all previous examples, wherein the task sensor is a soil organic matter sensor.

Example 4 is the mobile work machine data capture system of any or all previous examples, wherein the task sensor is a soil compaction sensor.

Example 5 is the mobile work machine data capture system of any or all previous examples, and further comprising a first robustly-identifiable identifiable location/motion module coupled to the processor, the processor being configured to issue a challenge to the first robustly-identifiable location/motion module and compare a response from the first robustly-identifiable location/motion module to an expected response to authenticate the first robustly-identifiable location/motion module, the processor being further configured to generate an indication of authentication failure if the response from the first robustly-identifiable location/motion module does not match the expected response.

Example 6 is the mobile work machine data capture system of any or all previous examples, wherein the location/motion module includes a GPS receiver.

Example 7 is the mobile work machine data capture system of any or all previous examples, wherein the location/motion module includes an inertial measurement unit.

Example 8 is the mobile work machine data capture system of any or all previous examples, wherein the location/motion module includes a physically unclonable function module and wherein the response from the robustly-identifiable location/motion module is based on a characteristic of the physically unclonable function module.

Example 9 is the mobile work machine data capture system of any or all previous examples, and further comprising a second robustly-identifiable identifiable location/motion module coupled to the processor, the processor being configured to issue a challenge to the second robustly-identifiable location/motion module and compare a response from the second robustly-identifiable location/motion module to an expected response to authenticate the second robustly-identifiable location/motion module, the processor being further configured to generate an indication of authentication failure if the response from the second robustly-identifiable location/motion module does not match the expected response.

Example 10 is the mobile work machine data capture system of any or all previous examples, wherein the processor is a robustly-identifiable processor.

Example 11 is the mobile work machine data capture system of any or all previous examples, wherein the robustly-identifiable processor is configured to employ a processor physically unclonable function to authenticate the processor.

Example 12 is the mobile work machine data capture system of any or all previous examples, wherein and further comprising a robustly-identifiable identifiable wireless communication module coupled to the processor, the processor being configured to issue a challenge to the robustly-identifiable wireless communication module and compare a response from the robustly-identifiable wireless communication module to an expected response to authenticate the robustly-identifiable wireless communication module, the processor being further configured to generate an indication of authentication failure if the response from the robustly-identifiable wireless communication module does not match the expected response.

Example 13 is the mobile work machine data capture system of any or all previous examples, wherein the robustly-identifiable wireless communication module includes a physically unclonable function module and wherein the response from the robustly-identifiable wireless communication module is based on a characteristic of the physically unclonable function module.

Example 14 is the mobile work machine data capture system of any or all previous examples, wherein the robustly-identifiable wireless communication module is configured to securely communicate with a remote device.

Example 15 is the mobile work machine data capture system of any or all previous examples, wherein the secure communication includes cryptographic communication.

Example 16 is a system for authenticating data of a mobile work machine. The system includes a remote computer system; a first data capture system mounted to an off-road mobile machine, the first data capture system comprising: a robustly-identifiable sensor module having a task sensor that provides a task sensor signal indicative of a task; a wireless communication module; and a processor coupled to the robustly-identifiable sensor module and the communication module, the processor being configured to acquire data from the task sensor signal and transmit the acquired data to the remote computer system using the wireless communication module; and a second data capture system disposed to capture additional data relative to operation of the mobile machine and transmit the additional data to the remote computer system; and wherein the remote computer system is configured to receive the acquired data from the first data capture system and to receive the additional data from the second data capture system and combine the acquired data and the additional data to generate combined data and wherein the remote computer system is configured to store the combined data in an immutable ledger.

Example 17 is the system of any or all previous examples, wherein the immutable ledger is a distributed, immutable ledger that employs blockchain.

Example 18 is the system of any or all previous examples, wherein the second data capture system captures data relative to at least one of location, time, and actions of the mobile machine.

Example 19 is the system of any or all previous examples, wherein the remote computer system is configured to compare the acquired data with the additional data and generate a deviation signal if there is a discrepancy exceeding a pre-selected threshold.

Example 20 is a data capture system for a mobile machine. The data capture system comprises at least one robustly-identifiable task sensor; at least one robustly-identifiably processor coupled to the at least one robustly-identifiable task sensor; at least one robustly-identifiable location/motion module coupled to the at least one robustly-identifiable processor and configured to provide an indication of at least one of geographic location and relative machine motion; at least one robustly-identifiable wireless transceiver operably coupled to the at least one robustly-identifiable processor and configured to securely communicate with a remote device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of authenticating a robustly-identifiable system, the method comprising:
    causing a processor of a mobile work machine to issue a challenge to a robustly-identifiable sensor module mounted relative to the mobile work machine;
    receiving, by the processor of the mobile work machine, a response from the robustly-identifiable sensor module;
    comparing, with the processor of the mobile work machine, the received response to an expected response to generate a match result; and
    selectively initiating trusted operation of the mobile work machine based on the match result.

2. The method of claim 1, and further comprising causing the processor of the mobile work machine to perform an initialization.

3. The method of claim 2, wherein the initialization includes causing the processor to check its own robustly-identifiable function.

4. The method of claim 3, wherein checking its own robustly-identifiable function includes challenging the processor and causing the processor to compare its own response to an expected response.

5. The method of claim 2, wherein initialization employs a physically unclonable function.

6. The method of claim 1, and further comprising:
    causing the processor of the mobile work machine to issue a challenge to a robustly-identifiable location module;
    receiving, by the processor of the mobile work machine, a response from the robustly-identifiable location module;
    comparing, with the processor of the mobile work machine, the received response from the robustly-identifiable location module to an expected response to generate a location module match result; and
    wherein selectively initiating trusted operation is also based on the location module match result.

7. The method of claim 1, and further comprising:
    causing the processor of the mobile work machine to issue a challenge to a robustly-identifiable communication module;
    receiving, by the processor of the mobile work machine, a response from the robustly-identifiable communication module;
    comparing, with the processor of the mobile work machine, the received response from the robustly-identifiable communication module to an expected response to generate a communication module match result; and
    wherein selectively initiating trusted operation is also based on the communication module match result.

8. The method of claim 1, wherein selectively initiating trusted operation of the mobile work machine based on the match result includes entering a failsafe mode based on a negative match result.

9. The method of claim 8, and further comprising performing data capture in the failsafe mode.

10. The method of claim 9, and further comprising providing an indication of failsafe mode.

11. A method of performing simultaneous machine data capture, the method comprising:
    causing a processor of a mobile work machine to collect data;
    causing the processor of the mobile work machine to watermark the collected data;
    causing the processor of the mobile work machine to perform on-board data authentication of the watermarked data;
    causing the processor of the mobile work machine to request third-party data authentication of the watermarked data; and
    causing the processor of the mobile machine to transmit its on-board watermarked data.

12. The method of claim 11, wherein the collected data is machine data.

13. The method of claim 11, and further comprising causing the processor of the mobile work machine to store the watermarked data in an immutable ledger.

14. The method of claim 13, wherein the immutable ledger is a blockchain.

15. The method of claim 11, and further comprising providing an indication of whether the watermarked data failed authentication.

16. The method of claim 11, and further comprising:
    causing the processor of the mobile work machine to receive a third-party data transmission responsive to the third-party data authentication request;
    causing the processor of the mobile machine to compare the on-board watermarked data with the third-party data transmission to determine whether the on-board watermarked data is discrepant; and
    selectively using the watermarked, on-board data based on whether the on-board watermarked data is discrepant.

17. The method of claim 16, wherein determining whether the on-board watermarked data is discrepant includes determining whether the on-board watermarked data is discrepant beyond a selected threshold.

18. The method of claim 16, and further including causing the processor of the mobile work machine to generate a deviation signal based on whether the on-board watermarked data is discrepant.

19. The method of claim 18, and further comprising causing the processor of the mobile machine to transmit the on-board watermarked data along with the deviation signal.

20. The method of claim 19, wherein the deviation signal provides an indication relative to data confidence.

* * * * *